(12) United States Patent
Plascencia-Vega et al.

(10) Patent No.: US 12,134,401 B2
(45) Date of Patent: Nov. 5, 2024

(54) LOCAL ASSISTANCE FOR AUTONOMOUS VEHICLE-ENABLED RIDESHARE SERVICE

(71) Applicant: GM Cruise Holdings LLC, San Francisco, CA (US)

(72) Inventors: Diego Plascencia-Vega, San Francisco, CA (US); Dogan Gidon, Berkeley, CA (US); Nestor Grace, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 290 days.

(21) Appl. No.: 17/550,324

(22) Filed: Dec. 14, 2021

(65) Prior Publication Data

US 2023/0182771 A1    Jun. 15, 2023

(51) Int. Cl.
| | | |
|---|---|---|
| *B60W 60/00* | (2020.01) | |
| *B60W 40/08* | (2012.01) | |
| *B60W 50/00* | (2006.01) | |
| *B60W 50/14* | (2020.01) | |
| *G05D 1/00* | (2024.01) | |
| *G06Q 50/40* | (2024.01) | |

(52) U.S. Cl.
CPC ........ *B60W 60/0011* (2020.02); *B60W 40/08* (2013.01); *B60W 50/14* (2013.01); *B60W 60/0015* (2020.02); *B60W 60/0016* (2020.02); *B60W 60/00253* (2020.02); *G05D 1/0011* (2013.01); *G06Q 50/40* (2024.01); *B60W 2050/0022* (2013.01); *B60W 2050/0054* (2013.01); *B60W 2050/146* (2013.01); *B60W 2540/215* (2020.02)

(58) Field of Classification Search
CPC .. B60W 60/0016; B60W 50/14; B60W 40/09; B60W 2540/01; G05D 1/0088
USPC ............................................................. 701/2
See application file for complete search history.

(56) References Cited

U.S. PATENT DOCUMENTS

| | | | |
|---|---|---|---|
| 9,958,870 B1 * | 5/2018 | Graybill | ................... G05D 1/02 |
| 2012/0284090 A1 | 11/2012 | Marins | |
| 2016/0370801 A1 * | 12/2016 | Fairfield | .............. G05D 1/0088 |
| 2019/0220010 A1 * | 7/2019 | Leonard | ................ B60W 50/14 |
| 2020/0062267 A1 * | 2/2020 | Magzimof | .......... B60W 50/082 |
| 2020/0241530 A1 | 7/2020 | Caveney | |
| 2020/0298892 A1 * | 9/2020 | Raichelgauz | .... G08G 1/096725 |
| 2020/0356090 A1 | 11/2020 | Thakur | |
| 2021/0001882 A1 * | 1/2021 | Mortazavi | ........ G08G 1/096725 |
| 2022/0171386 A1 | 6/2022 | Cui | |
| 2023/0205181 A1 | 6/2023 | Kishikawa | |

* cited by examiner

*Primary Examiner* — Todd Melton
*Assistant Examiner* — Vincent Feng (57) ABSTRACT

A method is described and includes subsequent to an autonomous vehicle becoming immobilized, initiating a local assistance request; subsequent to the initiating, receiving local assistance input from a passenger of the autonomous vehicle; and using the local assistance input to determine an action to be taken by the autonomous vehicle to mobilize the autonomous vehicle.

13 Claims, 7 Drawing Sheets

LOCAL ASSISTANCE FOR AUTONOMOUS VEHICLE-ENABLED RIDESHARE SERVICE

TECHNICAL FIELD OF THE DISCLOSURE

The present disclosure relates generally to rideshare services provided using autonomous vehicles and, more specifically, to techniques for providing local assistance for autonomous vehicle-enabled rideshare services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS OF THE DISCLOSURE

Overview

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

Given the numerous advantages of ride hail, rideshare, and delivery services (which services may be collectively and/or interchangeably referred to herein simply as "rideshare services" whether for a single user/passenger, multiple users/passengers, and/or one or more items for delivery) provided by autonomous vehicles, it is anticipated that autonomous vehicle rideshare services will soon become the ubiquitous choice for various user transportation and delivery needs, including but not limited to school commutes, airport transfers, long distance road trips, and grocery and restaurant deliveries, to name a few.

An autonomous vehicle may encounter difficult and/or long tail situations in the provision of rideshare services that may result in the vehicle becoming immobilized (or stuck) and/or unable to make a decision regarding how to proceed with driving (e.g., due to an inability to classify an object). In such cases, the autonomous vehicle may solicit assistance from a human operator located remotely from the vehicle ("remote assistance") to determine an appropriate course of action under the circumstances. Connectivity issues and/or operational difficulties, such as a limit on the number of remote operators available to respond to autonomous vehicle calls for remote assistance, may create situations in which remote assistance is not available in a timely manner. Such issues/difficulties may result in the autonomous vehicle remaining immobilized for an unacceptable period of time, which may lead to undesirable situations.

In accordance with features of embodiments described herein, an autonomous vehicle local assistance system enables an autonomous vehicle passenger to provide direct input to the autonomous vehicle decision making process ("autonomous system") to resolve situations that may be difficult for an autonomous system to handle but that may be straightforward for a human to solve. Such situations may include cases in which an autonomous vehicle is rendered immobile due to unexpected or incorrectly-identified objects/obstacles. Embodiments of an autonomous vehicle local assistance system may make autonomous vehicle operation smoother and more efficient and may give passengers a greater sense of control over their trip.

Passenger input may be constrained in such a way as to prevent malicious or erroneous interference (intentional or otherwise) by a passenger. In certain embodiments, a list of options and/or alternatives having confidence values that exceed a confidence value threshold and from which the passenger may select may be presented to the passenger in response to a request for local assistance. For example, in a situation in which an autonomous vehicle is rendered immobile, or stuck, a list of different potential maneuvers each having a confidence value that exceeds the confidence value threshold may be presented to the passenger (e.g., via an app displayed on the passenger's mobile device or on an in-cabin display of the autonomous vehicle). In this manner, the passenger is permitted to select a potential maneuver that would get the autonomous vehicle unstuck and allow the autonomous vehicle to continue toward the destination. It will be noted that, in accordance with embodiments described herein, the passenger may be prevented from overriding certain features (e.g., comfort features) otherwise imposed on the autonomous vehicle, as none of the options presented to the passenger fall outside the range of normal operation of the autonomous vehicle. In other words, the autonomous vehicle will continue to remain a proper distance from obstacles and other road actors while taking the passenger's input into consideration.

In accordance with features of embodiments described herein, a passenger may be prompted to assist in resolving a perception issue encountered by the autonomous vehicle. For example, in a situation in which an autonomous vehicle is unable to classify an object comprising a perceived obstacle with sufficient confidence and is therefore rendered immobile, the passenger may be presented with a list of options comprising potential classes for the object from which to select. As with the potential maneuvers described above, each of the potential classes presented to the passenger has a confidence value that exceeds a confidence value threshold. Once the passenger has made a selection from the list of options, the autonomous vehicle may use the passenger's input to plan an appropriate path around or over the object and continue along the route to the passenger's destination.

As used herein, "confidence value" may be a numerical value assigned to an option or alternative indicative of the likelihood that selection of the option/alternative will resolve the situation and/or not exacerbate the situation. Additionally and/or alternatively, the confidence value may be indicative of the relative confidence the autonomous system has in the maneuver and/or classification as applied to the situation at hand. In accordance with embodiments described herein, confidence values of options/alternatives will be compared to a confidence value threshold and only those options having confidence values that exceed the confidence value threshold will be presented to the passenger. In some embodiments, as will be described in greater detail below, the confidence value threshold may be adjusted based on a trust score of the passenger, with passengers having higher trust scores being presented with more options (corresponding to a lower confidence value threshold), while passengers with lower trust scores are presented with fewer options (corresponding to a higher confidence value threshold).

In accordance with features of embodiments described herein, an autonomous vehicle local assistance system may enable information that is directly and easily available to a passenger to be incorporated into the autonomous decision making process of the autonomous vehicle. Information input by a passenger may also be used to improve the performance of the autonomous system to eventually reduce reliance on local and remote assistance (e.g., by providing training data for training the autonomous system).

In certain situations, local assistance input may be initiated by a passenger in response to an autonomous vehicle being rendered immobile. In other situations, local assistance input may be initiated by a remote assistance operator. In still other situations, local assistance may be autonomically initiated by a remote assistance function, for example, in response to poor connectivity, outages, and/or personnel or other limitations. In accordance with features of embodiments described herein, a passenger may be assigned an individual trust score, which may be based on factors including but not limited to the level of the passenger's experience with autonomous vehicle operations in general, the level of the passenger's experience with operations of the particular rideshare service provider, the time of day, and/or any number of other factors. Additionally, permission levels and/or rewards may be associated with the various passenger trust values, or scores. For example, the input of a passenger who has exceeded a predetermined threshold level of quality local assistance inputs will be deemed more trustworthy ("higher quality") than the input of a user who has fewer quality local assistance inputs; as a result, the trust score of the former passenger may be higher than the trust score of the latter passenger. Conversely, a passenger who consistently selects inputs that turn out to be wrong may be flagged as "antagonistic" or "unreliable" and the passenger may be prevented from providing local assistance (or their input may be disregarded so as not to influence autonomous vehicle behavior). Additionally, the trust score of such an unreliable or antagonistic passenger presumably will be low. Passengers with trust scores above a certain trust score threshold may be presented with more options from which to select than those with trust scores below the trust score threshold. In certain embodiments, passengers may be incentivized to participate in local assistance and rewarded for quality inputs with awards such as ride credits and/or other incentives. Certain passengers may also be selected for testing or training using the local assistance system, with the trust scores of those passengers being adjusted according to their responses to requests for input regarding autonomous vehicle-related observations that may be unrelated to an actual on-road event, such as the vehicle being stuck or a perception issue. Moreover, the quality of passenger input may be evaluated through testing and/or known data annotation.

As will be appreciated by one skilled in the art, aspects of the present disclosure, in particular aspects of embodiments described herein, may be embodied in various manners (e.g., as a method, a system, an autonomous vehicle, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or 1 other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Autonomous Vehicle

Figure 1:
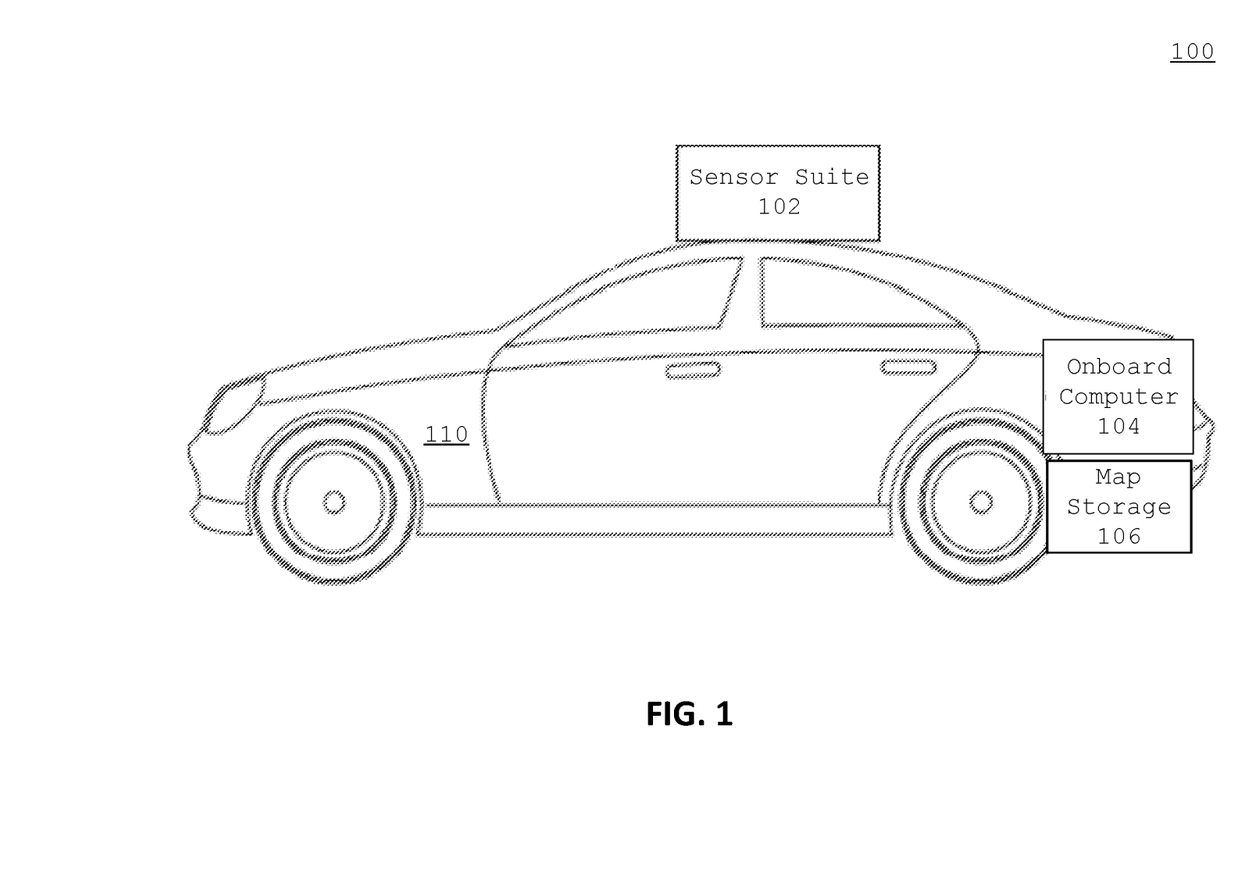
FIG. 1 is a diagram illustrating an example autonomous vehicle according to some embodiments of the present disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, radio detection and ranging (RADAR), SONAR, light ranging and detection (LIDAR), GPS, inertial measurement units (IMUS), accelerometers, microphones, strain gauges, pressure monitors, barometers, thermometers, altimeters, wheel speed sensors, and a CV system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high-fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, an airplane, a bike, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

Example Autonomous Vehicle Fleet

Figure 2:
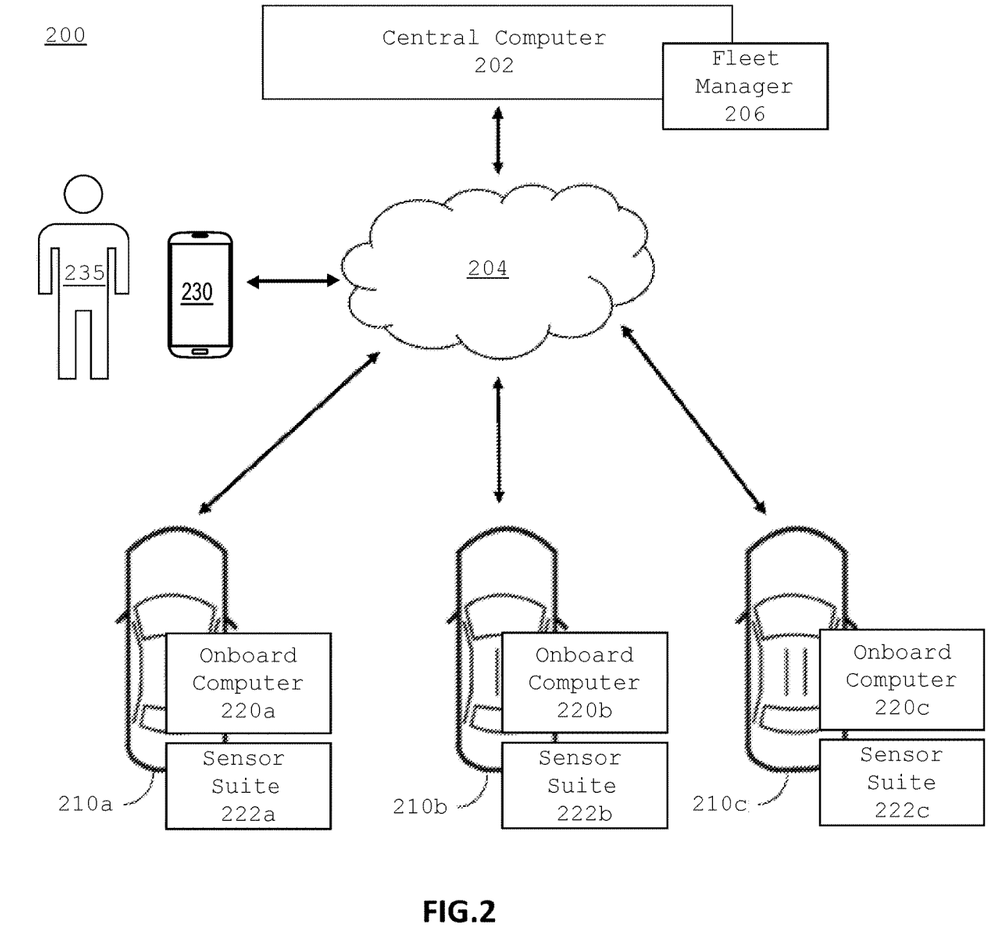
FIG. 2 is a diagram illustrating an example fleet of autonomous vehicles according to some embodiments of the present disclosure.

FIG. 2 is a diagram 200 illustrating a fleet of autonomous vehicles 210a, 210b, 210c in communication with a central computer 202 according to some embodiments of the disclosure. As shown in FIG. 2, the vehicles 210a-210c may communicate wirelessly with a central computer 202 and a cloud 204. The central computer 202 may include a fleet management system 206, which may include a routing coordinator and a database of information from the vehicles 210a-210c in the fleet. Each vehicle 210a-210c can include respective onboard computer 220a-220c and sensor suites 222a-222c, which can be similar to the onboard computer 104 and sensor suites 102 of FIG. 1.

The central computer 202 (and more particularly the fleet management system 206) may receive rideshare service requests for one of the autonomous vehicles 210 from user devices 230. Autonomous vehicle fleet routing refers to the routing of multiple vehicles in a fleet. In some implementations, autonomous vehicles communicate directly with each other. For example, a user 235 may make a request for rideshare service using a mobile app executing on the user device 230. The user device 230 may transmit the request directly to the fleet management system 206. The fleet management system 206 dispatches one of the autonomous vehicles 210a-210c to carry out the service request. When the dispatched one of the autonomous vehicles 210a-210c arrives at the pick-up location (i.e., the location at which the user is to meet the autonomous vehicle to begin the rideshare service), the user may be notified by the mobile app to meet the autonomous vehicle.

When a ride request is received from a passenger, the routing coordinator may select an autonomous vehicle 210a-210c to fulfill the ride request and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest time route for each autonomous vehicle. In some implementations, the routing coordinator uses collected position data to generate a best route for an autonomous vehicle in view of one or more traveling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

Central computer 202 may include a model trainer for training classification models used to classify objects by applying machine learning techniques to training data. Classification models may be downloaded to onboard computers 220a, 220b, 220c, for use in classifying objects encountered by the autonomous vehicle 210a, 210b, 210c.

Example Onboard Computer

Figure 3:
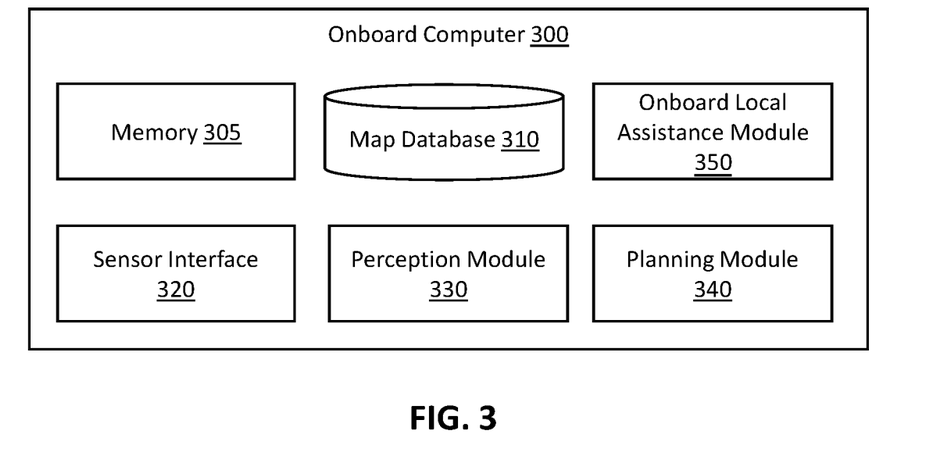
FIG. 3 is a diagram illustrating an onboard computer according to some embodiments of the present disclosure.

FIG. 3 is a block diagram illustrating an onboard computer 300, which may be used to implement onboard computer 104 (FIG. 1) and onboard computers 220 (FIG. 2) for enabling features according to some embodiments of the present disclosure. The onboard computer 300 may include memory 305, a map database 310, a sensor interface 320, a perception module 330, a planning module 340, and onboard local assistance module 350. In alternative configurations, fewer, different and/or additional components may be included in the onboard computer 300. For example, components and modules for controlling movements of the vehicles 110, 210, and other vehicle functions, and components and modules for communicating with other systems, such as central computer 202 and/or cloud 204, are not shown in FIG. 3. Further, functionality attributed to one component of the onboard computer 300 may be accomplished by a different component included in the onboard computer 300 or a different system from those illustrated.

The map database 310 stores a detailed map that includes a current environment of the vehicle. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite of the vehicle (e.g., sensor suite 140 (FIG. 1)). The sensor interface 320 may request data from the sensor suite, e.g., by requesting that a sensor capture data in a particular direction or at a particular time. The sensor interface 320 is configured to receive data captured by sensors of the sensor suite. The sensor interface 320 may have subcomponents for interfacing with individual sensors or groups of sensors of the sensor suite, such as a thermal sensor interface, a camera interface, a LIDAR interface, a RADAR interface, a microphone interface, etc.

The perception module 330 identifies objects in the environment of the vehicle. The sensor suite produces a data set that is processed by the perception module 330 to detect other cars, pedestrians, trees, bicycles, and objects traveling on or near a road on which the vehicle is traveling or stopped, and indications surrounding the vehicle (such as construction signs, traffic cones, traffic lights, stop indicators, and other street signs). For example, the data set from the sensor suite may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the vehicle as one of a set of potential objects, e.g., a vehicle, a pedestrian, or a cyclist. As another example, a human classifier recognizes humans in the environment of the vehicle, a vehicle classifier recognizes vehicles in the environment of the vehicle, etc.

The planning module 340 plans maneuvers for the vehicle based on map data retrieved from the map database 310, data received from the perception module 330, and navigation information, e.g., a route instructed by the fleet management system. In some embodiments, the planning module 340 receives map data from the map database 310 describing known, relatively fixed features and objects in the environment of the vehicle. For example, the map data includes data describing roads as well as buildings, bus stations, trees, fences, sidewalks, etc. The planning module 340 receives data from the perception module 330 describing at least some of the features described by the map data in the environment of the vehicle. The planning module 340 determines a pathway for the vehicle to follow. The pathway includes locations for the vehicle to maneuver to, and timing and/or speed of the vehicle in maneuvering to the locations.

The onboard local assistance module 350 may interact with other modules of the onboard computer 300 and other modules and systems to control and provide various aspects of the functionality and features of embodiments described herein and particularly as described below with reference to FIGS. 5-8.

Example Fleet Management System

Figure 4:
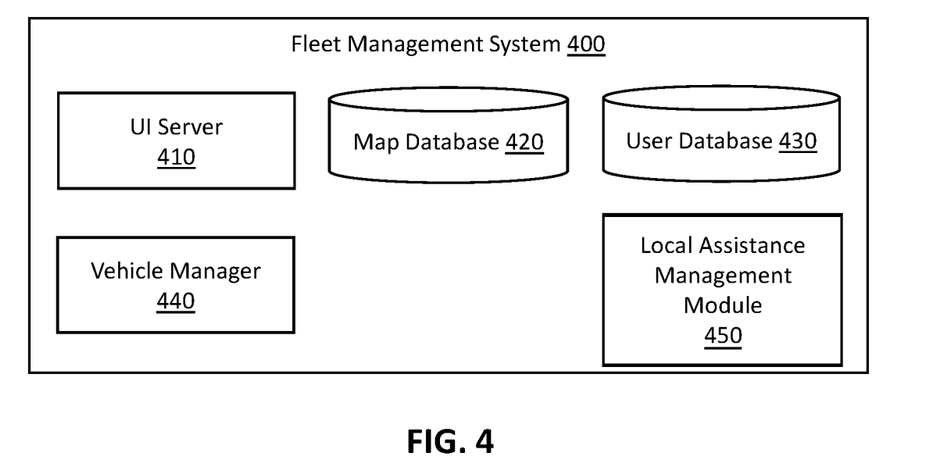
FIG. 4 is a diagram illustrating a fleet management system according to some embodiments of the present disclosure.

FIG. 4 is a block diagram illustrating a fleet management system 400, which may be implemented by central computer 202 (FIG. 2), according to some embodiments of the present disclosure. The fleet management system 400 includes a user interface (UI) server 410, a map database 420, a user database 430, a vehicle manager 440, and a local assistance management module 450. In alternative configurations, different, additional, or fewer components may be included in the fleet management system 400. Further, functionality attributed to one component of the fleet management system 400 may be accomplished by a different component included in the fleet management system 400 or a different system than those illustrated.

The fleet management system 400 manages a fleet of autonomous vehicles, such as autonomous vehicle 110. The fleet management system 400 may manage one or more services that provide or use the autonomous vehicles, e.g., a service for providing rides to users with the autonomous vehicles, or a service that delivers items, such as prepared foods, groceries, or packages, using the autonomous vehicles. The fleet management system 400 may select an autonomous vehicle from the fleet of autonomous vehicles to perform a particular service or other task and instruct the selected autonomous vehicle to autonomously drive to a particular location (e.g., a designated pick-up location) to pick-up a user and/or drop off an order to a user. The fleet management system 400 may select a route for the autonomous vehicle to follow. The fleet management system 400 may also manage fleet maintenance tasks, such as charging, servicing, and cleaning of the autonomous vehicle. As illustrated in FIG. 2, the autonomous vehicles may communicate with the fleet management system 400. The autonomous vehicle and the fleet management system 400 may connect over a public network, such as the Internet.

The UI server 410 is configured to communicate with client devices that provide a user interface to users. For example, the UI server 410 may be a web server that provides a browser-based application to client devices, or the UI server 410 may be a user app server that interfaces with a user app installed on client devices. The UI enables the user to access a service of the fleet management system 400, e.g., to request a ride from an autonomous vehicle, or to request a delivery from an autonomous vehicle. For example, the UI server 410 receives a request for a ride that includes an origin location (e.g., the user's current location) and a destination location, or a request for a delivery that includes a pick-up location (e.g., a local restaurant) and a destination location (e.g., the user's home address).

The map database 420 stores a detailed map describing roads and other areas (e.g., parking lots, autonomous vehicle service facilities) traversed by a fleet of autonomous vehicles, such as vehicles 210 (FIG. 2). The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to onboard computers of vehicles in the fleet, such as onboard computer 300 (FIG. 3), as a map database 310 (FIG. 3), described above.

The user database 430 stores data describing users of the fleet of vehicles managed by fleet management system 400. Users may create accounts with the fleet management system 400, which stores user information associated with the user accounts, or user profiles, in the user database 430. The user information may include identifying information (name, username), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 400. In some embodiments, the fleet management system 400 may infer some user information from usage data or obtain user information from other sources, such as public databases or licensed data sources.

The fleet management system 400 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 400 may obtain a home address from one or more alternate sources. In one example, the fleet management system 400 obtains an address associated with an official record related to a user, such as a record from a state licensing agency (e.g., an address on the user's driver's license), an address from the postal service, an address associated with a phone record, or other publicly available or licensed records. In another example, the fleet management system 400 infers a home address based on the user's use of a service provided by the fleet management system 400. For example, the fleet management system 400 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 400 may look up a candidate home address in the map database 420 to determine if the candidate home address is associated with a residential building type, e.g., a single-family home, a condominium, or an apartment. The fleet management system 400 stores the identified home address in the user database 430. The fleet management system 400 may obtain or identify multiple addresses for a user and associate each address with the user in the user database 430. In some embodiments, the fleet management system 400 identifies a current home address from multiple candidate home addresses, e.g., the most recent address, or an address that the user rides to or from most frequently and flags the identified current home address in the user database 430.

The vehicle manager 440 directs the movements of the vehicles in the fleet managed by fleet management system 400 (e.g., vehicles 210 (FIG. 2)). The vehicle manager 440 receives service requests from users from the UI server 410, and the vehicle manager 440 assigns service requests to individual vehicles. For example, in response to a user request for transportation from an origin location to a destination location, the vehicle manager 440 selects a vehicle and instructs the vehicle to drive to the origin location (e.g., a passenger or delivery pick-up location), and then instructs the vehicle to drive to the destination location (e.g., the passenger or delivery destination location). In addition, the vehicle manager 440 may instruct vehicles to drive to other locations while not servicing a user, e.g., to improve geographic distribution of the fleet, to anticipate demand at particular locations, to drive to a charging station for charging, etc. The vehicle manager 440 also instructs vehicles to return to autonomous vehicle facilities for recharging, maintenance, or storage.

The local assistance management module 450 may interact with other modules of the onboard computer 300 and the fleet management system 400 to manage and control various aspects of features and functionality of embodiments described herein and particularly as described below with reference to FIGS. 5-8.

Example Method for Local Assistance System Implementation and Operation

FIGS. 5-8 are flowcharts illustrating example processes for a local assistance system for an autonomous vehicle rideshare service according to some embodiments of the present disclosure. One or more of the steps illustrated in FIGS. 5-8 may be executed by one or more of the elements shown in the preceding figures.

Figure 5:
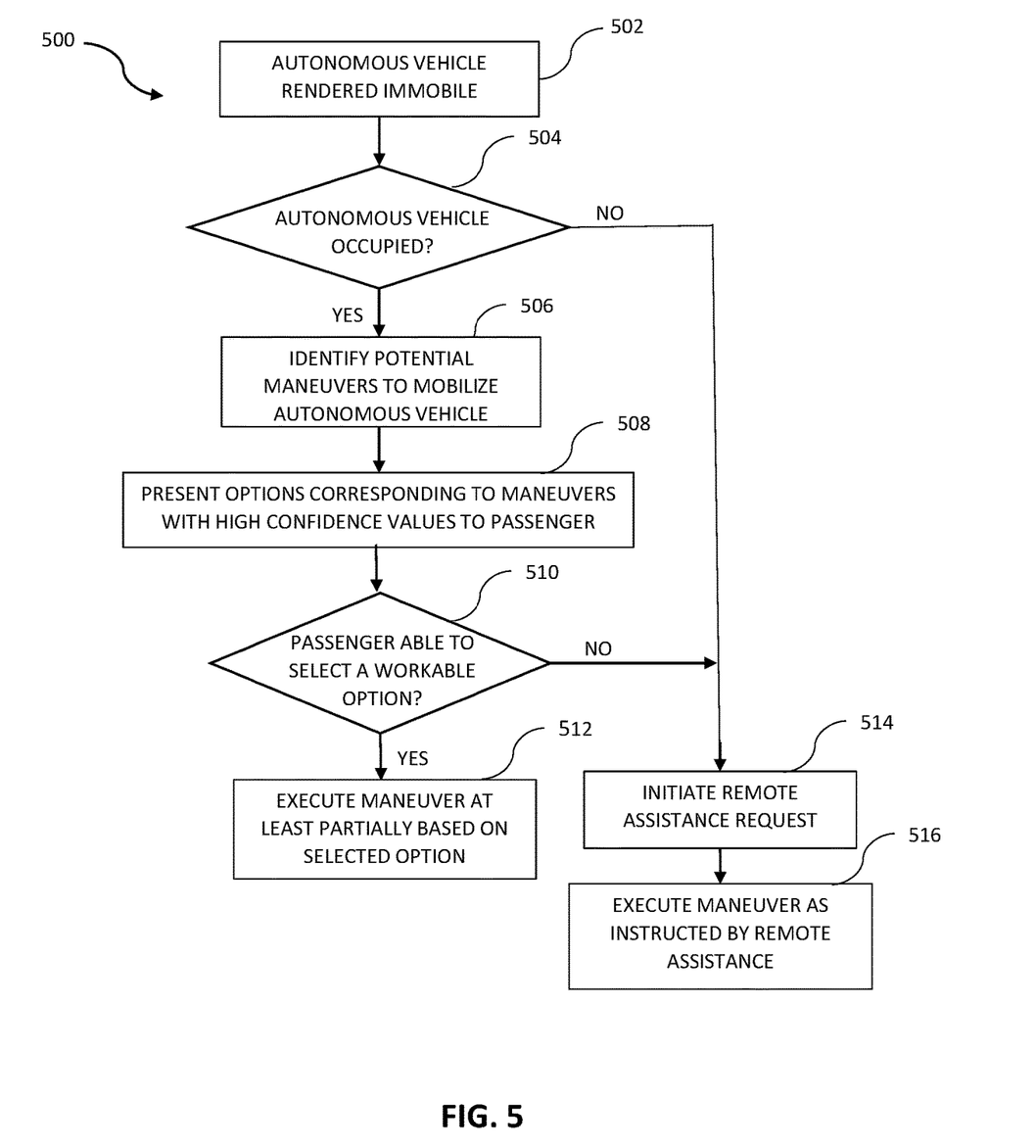
FIGS. 5-8 are flowcharts illustrating example processes of local assistance system according to some embodiments of the present disclosure.

FIG. 5 is a flowchart illustrating an example method 500 for a local assistance system for an autonomous vehicle rideshare service in accordance with features of embodiments described herein. In particular, the method 500 illustrates operation of the local assistance system to respond to a situation in which an autonomous vehicle is stuck (step 502). For example, in a situation in which the autonomous vehicle is proceeding through a construction zone, the autonomous vehicle may incorrectly perceive the width of area in the path of the autonomous vehicle and bounded on each side by concrete barriers as being too narrow to accommodate the width of the autonomous vehicle.

In step 504, a determination is made whether there is a passenger in the autonomous vehicle. If it is determined that there is a passenger in the autonomous vehicle, execution proceeds to step 506.

In step 506, potential maneuvers for mobilizing the autonomous vehicle (i.e., for getting the autonomous vehicle "unstuck") are identified. In the example indicated above, such maneuvers may include proceeding forward along the barriers, turning around and taking an alternative route, or navigating around the barriers.

In step 508, the maneuvers that have confidence values greater than a confidence value threshold are presented to the passenger, e.g., via an app displayed on a mobile device of the passenger or via an in-cabin display screen. In step 508, only maneuvers having an acceptable likelihood of succeeding (i.e., that have a confidence value above the confidence value threshold) are presented to the passenger as options; maneuvers that are unlikely to succeed (i.e., that have a confidence value at or below the confidence value threshold) are not presented to the passenger as options. It will be recognized that the confidence value threshold may be dynamically selected based on a trust score of the passenger, with a higher confidence value threshold selected for a passenger with a lower trust score and vice versa.

In step 510, a determination is made whether the passenger has selected a maneuver from the list of options presented. If it is determined in step 510 that the passenger has selected a maneuver from the list of options presented, execution proceeds to step 512. In particular embodiments, passengers having a trust score greater than a threshold trust score may be allowed to input their own path (e.g., by tracing a route on a map provided for that purpose on a UI) rather than selecting from a list of options presented.

In step 512, a maneuver selected at least in part based on the input from the passenger is executed and (presumably) the autonomous vehicle continues on the planned (or revised, depending on the executed maneuver) route to the passenger's destination.

If in step 504 it is determined that there is not a passenger in the autonomous vehicle (in which case, local assistance is not available), execution proceeds to step 514, in which a remote assistance request is initiated.

Similarly, if in step 510 it is determined that the passenger has not selected an option, execution proceeds to step 514, in which a remote assistance request is initiated.

In step 516, a maneuver recommended by the remote assistance operator is executed and (presumably) the autonomous vehicle continues on the planned (or revised, depending on the executed maneuver) route to the passenger's destination.

In accordance with certain features of embodiments described herein, and as described in greater detail hereinbelow, the quality of the input provided by the passenger in step 510 may be evaluated and used to adjust the trust score assigned to the passenger for use in weighting future input from the passenger in providing local assistance. For example, if the input provided by the passenger facilitates the autonomous vehicle becoming unstuck, the passenger's trust score may be positively adjusted. Conversely, if the input provided by the passenger results in damage to the autonomous vehicle, the passenger's trust score may be negatively adjusted. Similarly, a failure of a passenger to provide input in step 510 may be used to adjust the trust score of the passenger or may result in the passenger being temporarily or permanently prevented from participation in the local assistance system. In certain embodiments, input from a passenger having a high trust score will be given more weight by the autonomous system than input from a passenger having a low trust score.

Figure 6:
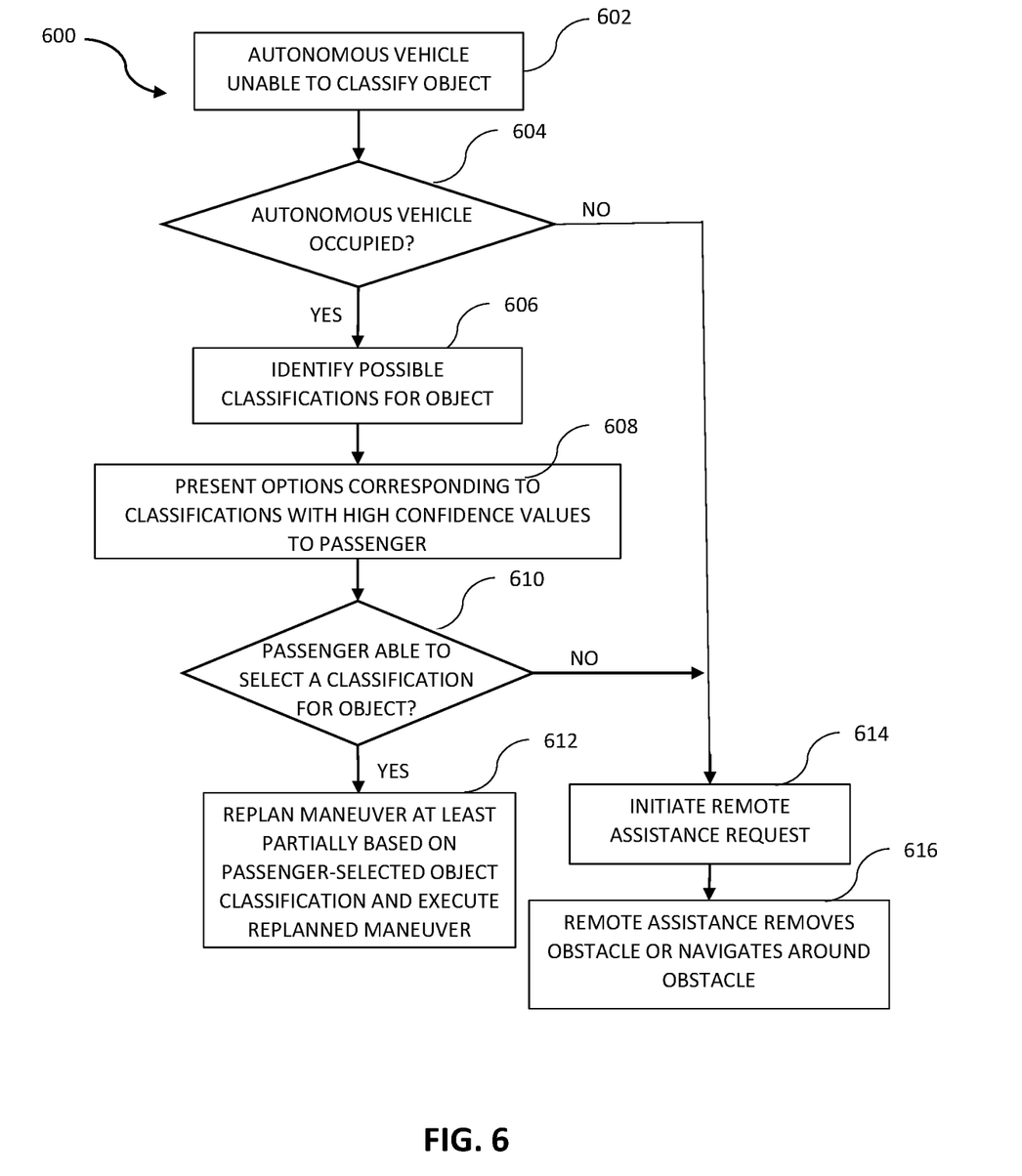

FIG. 6 is a flowchart illustrating an example method 600 for a local assistance system for an autonomous vehicle rideshare service in accordance with features of embodiments described herein. In particular, the method 600 illustrates operation of the local assistance system to respond to a situation in which an autonomous vehicle is unable to classify an object in its path (step 602).

In step 604, a determination is made whether there is a passenger in the autonomous vehicle. If it is determined that there is a passenger in the autonomous vehicle, execution proceeds to step 606.

In step 606, potential classifications for the object are identified.

In step 608, the classifications that have a confidence value greater than a confidence value threshold are presented to the passenger, e.g., via an app displayed on a mobile device of the passenger or via an in-cabin display screen. In step 608, only the classifications that have an acceptable likelihood of being accurate (i.e., that have a confidence value above the confidence value threshold) are presented to the passenger as options; classifications that are unlikely to be accurate (i.e., that have a confidence value at or below the confidence value threshold) are not presented to the passenger as options. It will be recognized that the confidence value threshold may be dynamically selected based on a trust score of the passenger, with a higher confidence value threshold selected for a passenger with a lower trust score and vice versa.

In step 610, a determination is made whether the passenger has selected a classification. If it is determined in step 610 that the passenger has selected a classification, execution proceeds to step 612.

In step 612, the autonomous vehicle navigates around or over the object based at least in part on the object classification selected by the passenger and (presumably) the autonomous vehicle continues on the planned (or revised, based on the maneuvers made in view of the object classification) route to the passenger's destination.

If in step 604 it is determined that there is not a passenger in the autonomous vehicle (in which case, local assistance is not available), execution proceeds to step 614, in which a remote assistance request is initiated.

Similarly, if in step 610 it is determined that the passenger has not selected an option, execution proceeds to step 614, in which a remote assistance request is initiated.

In step 616, the remote assistance maneuver recommended by the remote assistance operator based on the classification of the object is executed and (presumably) the autonomous vehicle continues on the route to the passenger's destination.

As will be described in greater detail below, in accordance with certain features of embodiments described herein, the quality of the input provided by the passenger in step 610 may be evaluated and used to adjust a trust score assigned to the passenger for use in weighting future input from the passenger in providing local assistance. For example, if the input provided by the passenger results in an appropriate classification of the object and facilitates the autonomous vehicle moving over or around the object as necessary, the passenger's trust score may be adjusted in a positive direction. Conversely, if the input provided by the passenger results in damage to the autonomous vehicle due to misclassification of the object, the passenger's trust score may be adjusted in a negative direction. Similarly, a failure of a passenger to provide input in step 610 may be used to adjust the trust score of the passenger or may result in the passenger being temporarily or permanently excluded from participation in the local assistance system. In certain embodiments, input from a passenger having a high trust score will be given more weight than input from a passenger having a low trust score.

Figure 7:
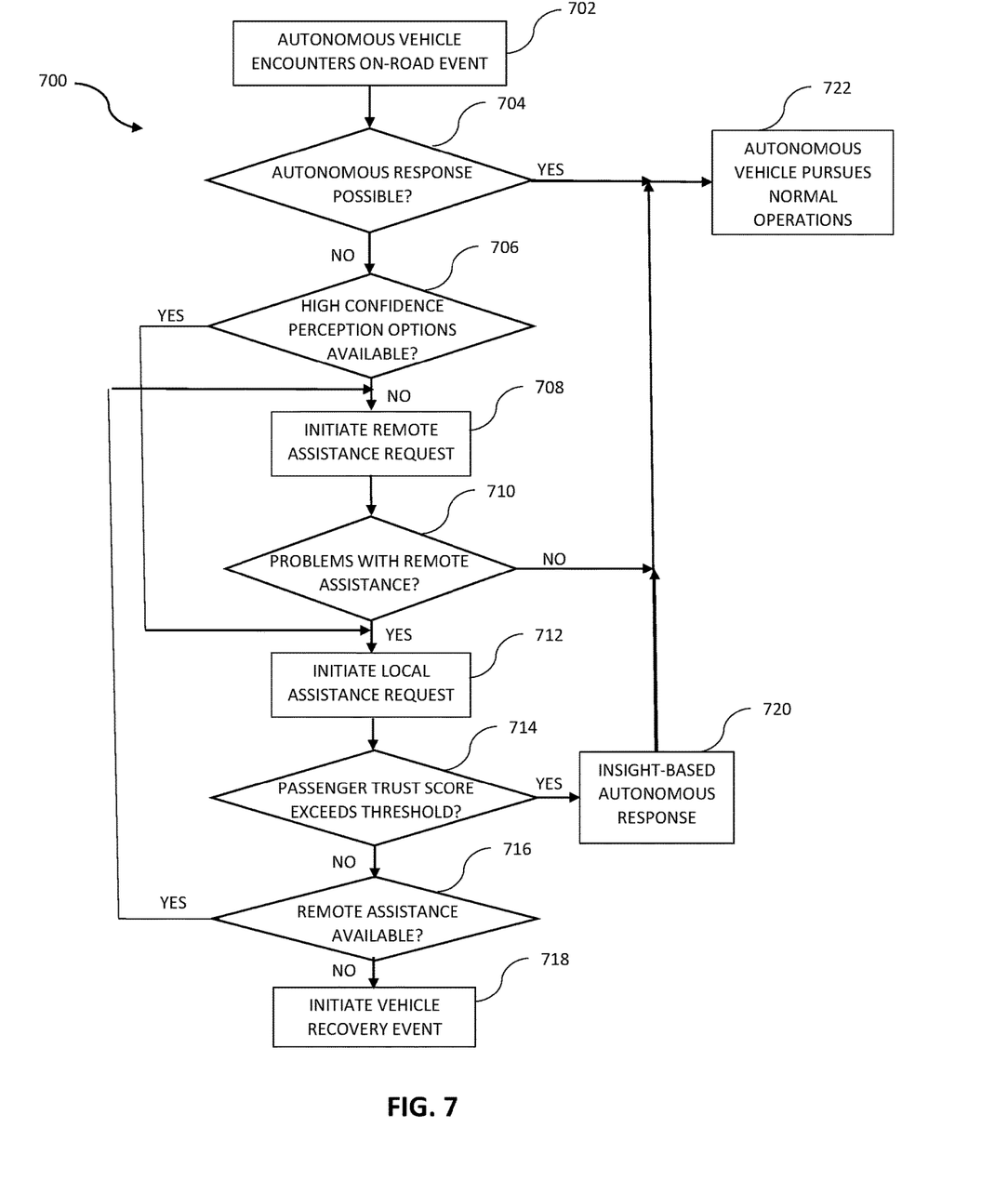

FIG. 7 is a flowchart illustrating an example method 700 for a local assistance system for an autonomous vehicle rideshare service in accordance with features of embodiments described herein. In particular, the method 700 illustrates operation of the local assistance system in response to a situation in which the autonomous vehicle encounters an on-road event (step 702).

In step 704, a determination is made whether the autonomous system is capable of responding to the on-road event without additional input. It will be recognized that in normal operation, the autonomous system will be able to respond to the majority of on-road events encountered by the autonomous vehicle. If it is determined in step 704 that the autonomous system is not capable of responding to the on-road event without additional input, execution proceeds to step 706.

In step 706, a determination is made whether there are one or more high confidence value perception options available for presentation to a passenger of the autonomous vehicle. In some embodiments, the operations performed in step 706 may be performed with reference to a trust score of the passenger and a corresponding confidence value threshold, which may at least partially correspond to the passenger's trust score. If in step 706, it is determined that there are no high confidence perception options available for presentation to the passenger (in which case, local assistance is deemed not useful), execution proceeds to step 708.

In step 708, a remote assistance request is initiated.

In step 710, a determination is made whether there are issues with the remote assistance requested in step 708. Potential issues with the remote assistance request may include, but are not limited to, poor connectivity or an insufficient number of remote assistance operators, the remote assistance system requesting local assistance and/or the passenger requesting local assistance. If in step 710, it is determined that there are issues with the remote assistance request, execution proceeds to step 712.

Similarly, if in step 706 it is determined that there are high confidence perception options available, execution proceeds to step 712.

In step 712, a local assistance request is initiated and the high confidence perception options are presented to the passenger. It will be recognized that the particular high confidence perception options presented to the user in step 712 may depend on the trust score of the passenger. For example, if the passenger has a high trust score, indicating for example that the passenger is an autonomous vehicle technician, has significant experience with the rideshare service and/or has historically provided high-quality input, a higher number of options may be presented (e.g., corresponding to a lower confidence value threshold). Alternatively, if the passenger has a low trust score, indicating for example that the passenger has less experience with the rideshare service and/or has historically failed to provide high-quality input, a smaller number of options may be presented (e.g., corresponding to a higher confidence value threshold).

In step 714, a determination is made whether the trust score of the passenger exceeds a trust score threshold. It will be recognized that trust scores may be categorized in ranges, such that a number of trust score thresholds are specified with each threshold corresponding to a range and each range of trust scores having associated therewith certain permissions and privileges (or lack thereof) in connection with the local assistance system. If it is determined in step 714 that the trust score of the passenger does not exceed the trust score threshold, execution proceeds to step 716.

In step 716, a determination is made whether remote assistance is available. If it is determined in step 716 that remote assistance is available, execution returns to step 708. If it is determined in step 716 that remote assistance is not available, execution proceeds to step 718, in which an autonomous vehicle recovery event is initiated by the rideshare service provider.

If in step 714 it is determined that the trust score of the passenger exceeds the trust score threshold, execution proceeds to step 720.

In step 720, the user input is considered by the autonomous system in determining a response to the on-road event. It will be recognized that the user input may be weighted based on the trust score of the passenger or the range in which the trust score falls. In particular, input from a passenger with a high trust score will be given more weight than input from a passenger with a lower trust score.

In step 722, normal operation of the autonomous vehicle continues.

If in step 704 it is determined that the autonomous system is capable of responding to the on-road event without additional input, execution proceeds directly to step 722.

Figure 8:
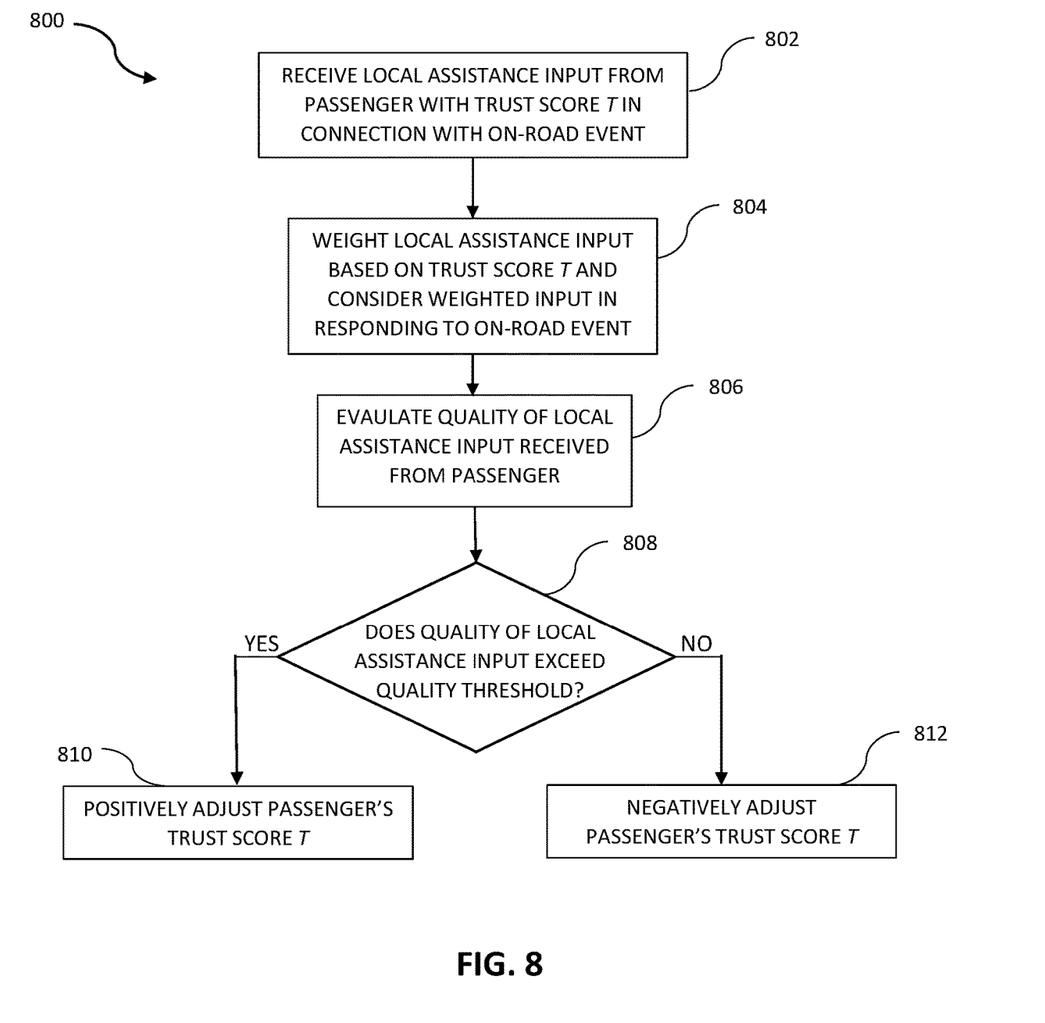

FIG. 8 is a flowchart illustrating an example method 800 for a local assistance system for an autonomous vehicle rideshare service in accordance with features of embodiments described herein. In particular, the method 800 illustrates operation of the local assistance system for adjusting a trust score of a passenger in response to the quality of local assistance input provided by the passenger.

In step 802, local assistance input is received in connection with an on-road event from a passenger with a trust score T.

In step 804, the received input is weighted using the trust score T and the weighted input is considered by the autonomous system in responding to the on-road event.

In step 806, the local assistance input received from the passenger is evaluated for quality. In one instance, the local assistance input may be evaluated based on the results and/or the outcome following actions taken by the autonomous vehicle in at least partial consideration of the input. For example, assuming the passenger input classifies an object is an empty trash bag and, at least partially as a result of that input, the autonomous vehicle proceeds forward over the object. If the object is in fact an empty trash bag, the evaluation may indicate that the input was high-quality, as the action taken by the autonomous vehicle at least partially in consideration of the input resulted in no physical damage to the autonomous vehicle. If, however, instead of an empty trash bag, the object was a rock driving over which resulted in damage to the undercarriage of the autonomous vehicle, the evaluation may indicate that the input was low quality, as the action taken by the autonomous vehicle at least partially in consideration of the input resulted in physical damage to the autonomous vehicle.

In step 808, a determination is made whether the quality of the local assistance input exceeds a quality threshold. If it is determined that the quality of the local assistance input exceeds the quality threshold, execution proceeds to step 810; otherwise, execution proceeds to step 812.

In step 810, the passenger's trust score T is positively adjusted to account for the relatively high-quality of the passenger's local assistance input.

In step 812, the passenger's trust score T is negatively adjusted to account for the relatively low quality of the passenger's local assistance input.

As previously indicated, a passenger's trust score may also be positively or negatively impacted by the number of rideshare rides logged by the user, with the trust score being generally positively impacted with an increasing number of rides logged. Additionally and/or alternatively, a passenger's trust score may also be impacted by an amount of experience the passenger may have with rideshare services in general and/or with the particular rideshare service. For example, a technician employed by the rideshare service provider may be assigned a higher trust score than an average customer of the rideshare service provider.

As also previously indicated, permission levels and/or rewards may be associated with particular ranges of passenger trust scores. For example, a passenger with a trust score that falls in a first range may be presented with more opportunities to provide local assistance input than a passenger with a lower trust score that falls in a second range. Additionally and/or alternatively, passengers having trust scores in or above a certain range may be provided with ride credits or free delivery services, for example, as a reward for their quality participation in the local assistance system. In contrast, passengers having trust scores in or below a particular range may be barred from or provided limited opportunities to participate in the local assistance system. In certain embodiments, passengers may opt into a training program associated with the local assistance system in which passengers are provided with opportunities to classify objects and/or provide perception inputs for on-road events that the autonomous vehicle system is capable of handling without passenger input. In such instances, the passenger input is not considered in making autonomous vehicle decisions but instead are evaluated against the decisions made by the autonomous vehicle system, with the passenger's trust score optionally being adjusted based on the evaluation.

In accordance with certain embodiments, high-quality inputs provided by passengers may be used as training data for use in training of classification and other models employed by the autonomous vehicle system.

Although the operations of the example methods shown in FIGS. 5-8 are illustrated as occurring once each and in a particular order, it will be recognized that the operations may be performed in any suitable order and repeated as desired. Additionally, one or more operations may be performed in parallel. Furthermore, the operations illustrated in FIGS. 5-8 may be combined or may include more or fewer details than described.

Select Examples

Example 1 provides a method comprising, subsequent to an event causing an autonomous vehicle to become immobilized, initiating a local assistance request; subsequent to the initiating, receiving local assistance input from a passenger of the autonomous vehicle; and determining an action to be taken by the autonomous vehicle to mobilize the autonomous vehicle based at least in part on the received local assistance input.

Example 2 provides the method of example 1, wherein the receiving local assistance comprises presenting the passenger with a plurality of options from which to select and prompting the passenger to select one of the presented options.

Example 3 provides the method of example 2, wherein the options comprise autonomous vehicle maneuvers for mobilizing the autonomous vehicle.

Example 4 provides the method of example 2, wherein each of the options have a confidence value above a threshold confidence value.

Example 5 provides the method of example 4, wherein the threshold confidence value is selected based at least in part on a trust score assigned to the passenger.

Example 6 provides the method of any of the foregoing examples, further comprising assigning a trust score to the passenger.

Example 7 provides the method of example 6, wherein the trust score is based on at least one of a level of experience of the passenger with a rideshare service provided by the autonomous vehicle and a quality of local assistance input previously provided by the passenger.

Example 8 provides the method of example 7, further comprising weighting the local assistance input based on the trust score, wherein the determining an action to be taken by the autonomous vehicle to mobilize the autonomous vehicle is based at least in part on the weighted local assistance input.

Example 9 provides the method of any of the foregoing examples, wherein the request for local assistance is initiated by at least one of a remote assistance system and the passenger.

Example 10 provides the method of any of the foregoing examples, further comprising, evaluating the local assistance input based at least in part on a result of the autonomous vehicle taking the determined action.

Example 11 provides the method of example 10, further comprising adjusting a trust score assigned to the passenger based on results of the evaluating.

Example 12 provides the method of any of the foregoing examples, further comprising using the local assistance input to train a system for controlling the autonomous vehicle.

Example 13 provides a method comprising, subsequent to a failure of an autonomous vehicle to classify an object encountered by the autonomous vehicle, initiating a local assistance request; subsequent to the initiating, receiving local assistance input from a passenger of the autonomous vehicle regarding a classification of the object; classifying the object based at least in part on the local assistance input; and causing the autonomous vehicle to perform a maneuver based on the classifying.

Example 14 provides the method of example 13, wherein the requesting local assistance comprises presenting the passenger with a plurality of options from which to select and prompting the passenger to select one of the presented options.

Example 15 provides the method of example 14, wherein the options comprise possible classifications for the object.

Example 16 provides the method of example 14, wherein each of the options have a confidence value above a threshold confidence value.

Example 17 provides the method of example 16, wherein the threshold confidence value is selected based at least in part on a trust score assigned to the passenger.

Example 18 provides the method of any of the foregoing examples, further comprising assigning a trust score to the passenger.

Example 19 provides the method of example 18, wherein the trust score is based on at least one of a level of experience of the passenger and a quality of local assistance input previously provided by the passenger.

Example 20 provides the method of example 19, further comprising weighting the local assistance input based on the trust score and wherein the using the local assistance input comprises using the weighted local assistance input.

Example 21 provides the method of any of the foregoing examples, wherein the request for local assistance is initiated by at least one of a remote assistance system and the passenger.

Example 22 provides the method of any of the foregoing examples, further comprising evaluating the local assistance input.

Example 23 provides the method of example 22, further comprising adjusting a trust score assigned to the passenger based on results of the evaluating.

Example 24 provides the method of any of the foregoing examples, further comprising using the local assistance input to train a system for controlling the autonomous vehicle.

Example 25 provides a method for responding to an on-road event experienced by an autonomous vehicle, the method comprising determining whether there are high confidence options available for responding to the on-road event; if there are high confidence options available for responding to the on-road event, initiating a local assistance request; after the initiating, determining whether a passenger of the autonomous vehicle has a trust score that exceeds a threshold trust score; and if the trust score exceeds the threshold trust score, prompting the passenger to provide local assistance input.

Example 26 provides the method of example 25, wherein the prompting comprises presenting the passenger with a plurality of options from which to select, the method further comprises receiving one of the options selected by the passenger, the received one of the options comprising the local assistance input.

Example 27 provides the method of example 26, further comprising weighting the local assistance input based on the trust score and using the weighted local assistance input to determine an action to be taken by the autonomous vehicle to mobilize the autonomous vehicle.

Example 28 provides the method of example 26, wherein the options comprise autonomous vehicle maneuvers for mobilizing the autonomous vehicle.

Example 29 provides the method of example 26, wherein the options comprise possible classifications for the object.

Example 30 provides the method of example 26, wherein each of the options have a confidence value above a threshold confidence value.

Example 31 provides the method of example 30, wherein the threshold confidence value is selected based at least in part on the passenger's trust score.

Example 32 provides the method of any of the foregoing examples, wherein the trust score is based on at least one of a level of experience of the passenger and a quality of local assistance input previously provided by the passenger.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

What is claimed is:

1. A method comprising:
    subsequent to an event causing an autonomous vehicle to become immobilized, initiating a local assistance request;
    subsequent to the initiating, receiving local assistance input from a passenger of the autonomous vehicle, wherein the receiving local assistance comprises presenting the passenger with a plurality of options from which to select and prompting the passenger to select one of the presented options, each of the options having a confidence value above a threshold confidence value, wherein the threshold confidence value is selected based at least in part on a trust score assigned to the passenger; and
    determining an action to be taken by the autonomous vehicle to mobilize the autonomous vehicle based at least in part on the received local assistance input.

2. The method of claim 1, wherein the options comprise autonomous vehicle maneuvers for mobilizing the autonomous vehicle.

3. The method of claim 1, wherein the trust score is based on at least one of a level of experience of the passenger with a rideshare service provided by the autonomous vehicle and a quality of local assistance input previously provided by the passenger.

4. The method of claim 3, further comprising weighting the local assistance input based on the trust score, wherein the determining an action to be taken by the autonomous vehicle to mobilize the autonomous vehicle is based at least in part on the weighted local assistance input.

5. The method of claim 1, wherein the request for local assistance is initiated by at least one of a remote assistance system and the passenger.

6. The method of claim 1, further comprising, evaluating the local assistance input based at least in part on a result of the autonomous vehicle taking the determined action.

7. The method of claim 6, further comprising adjusting the trust score assigned to the passenger based on results of the evaluating.

8. The method of claim 1, further comprising using the local assistance input to train a system for controlling the autonomous vehicle.

9. A method comprising:
    subsequent to an inability of an autonomous vehicle to classify an object encountered by the autonomous vehicle, initiating a local assistance request;
    subsequent to the initiating, receiving local assistance input from a passenger of the autonomous vehicle regarding a classification of the object, wherein the receiving local assistance comprises presenting the passenger with a plurality of options from which to select and prompting the passenger to select one of the presented options, each of the options having a confidence value above a threshold confidence value, wherein the threshold confidence value is selected based at least in part on a trust score assigned to the passenger;

classifying the object based at least in part on the local assistance input; and causing the autonomous vehicle to perform a maneuver based on the classifying.

10. The method of claim 9, wherein the options comprise possible classifications for the object.

11. A method for responding to an on-road event experienced by an autonomous vehicle, the method comprising:

determining whether there are high confidence options available for responding to the on-road event, wherein the high confidence options each have a confidence value above a threshold confidence value, the threshold confidence value is selected based at least in part on a trust score of a passenger of the autonomous vehicle;

if there are high confidence options available for responding to the on-road event, initiating a local assistance request;

after the initiating, determining whether the trust score of the passenger of the autonomous vehicle exceeds a threshold trust score;

if the trust score exceeds the threshold trust score, prompting the passenger to provide local assistance input, wherein the prompting comprises presenting the passenger with at least one of the high confidence options from which to select; and receiving one of the high confidence options selected by the passenger, the received one of the high confidence options comprising the local assistance input.

12. The method of claim 11, further comprising weighting the local assistance input based on the trust score and using the weighted local assistance input to determine an action to be taken by the autonomous vehicle to mobilize the autonomous vehicle.

13. The method of claim 11, wherein the high confidence options comprise at least one of autonomous vehicle maneuvers for mobilizing the autonomous vehicle and possible classifications for the object.

* * * * *